83-767. OR RE 5,037 SR

L. W. LANGDON.

Improvement in Miter-Boxes.

No. 5,037. Reissued Aug. 20, 1872.

*Witnesses.*
A. McCallum
D. G. Stuart

*Inventor.*
L. W. Langdon
by P. Hannay
Atty.

AM. PHOTO-LITHOGRAPHIC CO. N.Y. (OSBORNE'S PROCESS.)

143. WOOD-SAWING.
Miter Boxes,
87 Adjustable.

2 Sheets--Sheet 2.

L. W. LANGDON.

Improvement in Miter-Boxes.

No. 5,037. Reissued Aug. 20, 1872.

Witnesses
A. McCallum
D. G. Stuart

Inventor:
L. W. Langdon
by J. Hannay
Atty

AM. PHOTO-LITHOGRAPHIC CO. N.Y. (OSBORNE'S PROCESS.)

UNITED STATES PATENT OFFICE.

LEANDER WESLEY LANGDON, OF NORTHAMPTON, MASSACHUSETTS.

IMPROVEMENT IN MITER-BOXES.

Specification forming part of Letters Patent No. 45,055, dated November 15, 1864; reissue No. 5,037, dated August 20, 1872.

SPECIFICATION.

*To all whom it may concern:*

Be it known that I, LEANDER W. LANGDON, of Northampton, in the county of Hampshire and State of Massachusetts, have invented certain new and useful Improvements in Miter-Boxes, of which the following is a specification, reference being had to the accompanying drawing making part of this specification, in which—

Figure 5:
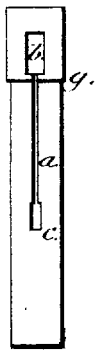
Figure 4:
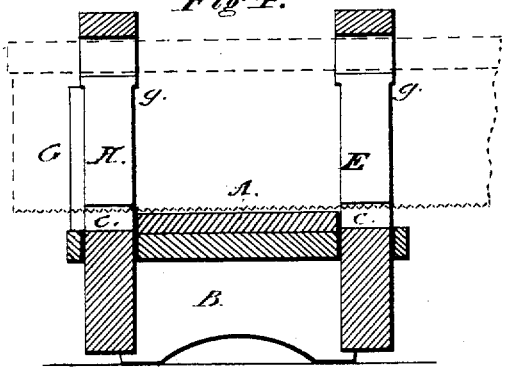
Figure 1:
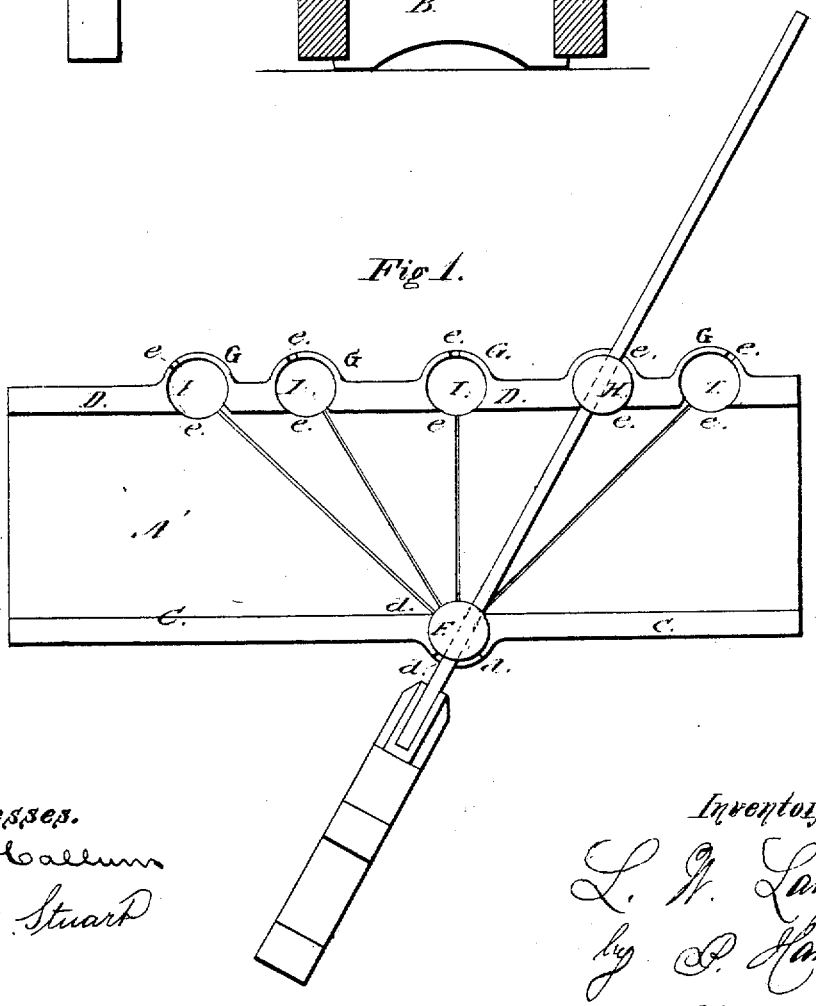
Figure 3:
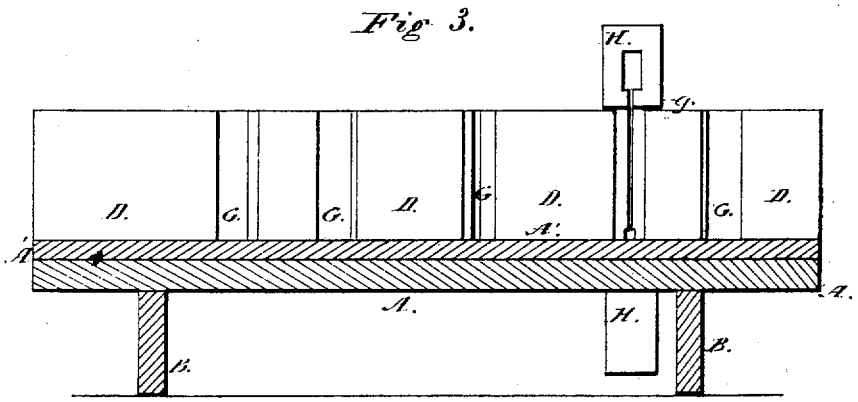
Figure 2:
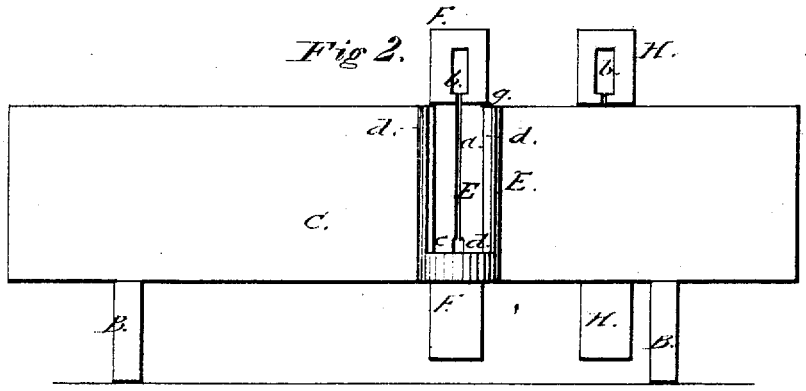

Figure 1 represents a plan of a miter-box having my improvements applied thereto, and showing the saw in position; and Fig. 2, a side elevation of the same, but with the saw removed. Fig. 3 represents a vertical longitudinal section without the saw, and Fig. 4, a vertical cross-section of the same, showing in dotted lines the position of the saw, a portion of the latter, however, being broken off.

My invention relates to an improvement in the common miter-box, which, while enabling miters of different angles to be cut, will hold the saw firmly in proper position during the operation, so that a clean and determinate cut shall be made; a cut that will afterwards require but little, if any, fitting or dressing that a good joint may be made; and it also relates to an improved mode of preventing the saw from cutting against the sides or bottom of the box; and it consists, first, in the application to a miter-box of a vertically-sliding and horizontally-rotating guide for the saw at a point so arranged on one side of the box as to form a stationary pivotal point upon which the saw can turn in order to cut the stock at the desired angle for the required miter; secondly, in combining with the vertically-sliding pivotal saw-guide above named a vertically-sliding saw-guide, arranged on the other side of the box for the proper support and guidance of the other end of the saw; thirdly, in a box provided with a series of open cylinders for the reception of a saw-guide, they being so arranged with relation to the pivotal saw-guide as that when provided with a proper saw-guide miters of different but definite angles may be cut.

To enable others skilled in the art to make, construct, and use my improvements, I will now proceed to describe them in detail.

The box is made rectangular in form, but considerably longer than it is broad, as may be seen by reference to Fig. 1, and consists of a bed-plate, A, suitably supported on legs or standards B arranged at or near each end, and, if necessary, provided with lugs having a bolt-hole, through which it can be firmly secured to the work-bench, although such is not absolutely necessary. Upon the bed-plate is arranged a wooden bottom, A′, against which to cut. On this bed-plate is cast, bolted, or otherwise secured, guide-plates C and D, so as to project vertically above it. At or near the middle of the plate C is formed a vertical tubular cylinder, E, for the reception of a cylindrical saw-guide, F, Fig. 2. This saw-guide is made to fit snugly in the opening of the cylinder E, but so as to turn and slide freely up and down therein; it being made to fit snugly that the saw may be held firmly in a vertical position without vibrating while cutting the miter, and to turn that the saw may be adjusted with relation to the guide sides C and D, that the proper angle for the required miter may be cut, and to slide freely up and down that the saw may be enabled to follow to the last with a fresh bite of its teeth as the cut is being made. For this purpose the cylindrical saw-guide F is provided with a radial slot, *a*, of a length nearly equal to the width of the blade of the saw intended to be used in connection with the box; and which slot is made to communicate at its upper end with another slot or opening, *b*, of such size and shape as readily to receive the heel or strengthening plate of the blade, and at its lower end with another enlarged slot, *c*, between the sides of which the teeth of the saw are intended to play, they being placed at such distance apart as to prevent all contact with the sides of the teeth. This slot *c* is elongated vertically, so as to permit requisite vertical play in the saw. The upper end of the saw-guide is enlarged, so as to form a seat or arrest, *g*, which is so arranged as to come in contact with the upper edge of the side-plates C and D at the moment the saw has passed through the stuff being cut, thereby preventing any further descent of the saw. The hollow cylinder E is provided with a slot at *d* on each side to permit of the swiveling of the saw, as shown in Figs. 1 and 2, neither of the slots, however, being so large as to interfere with the proper support of the saw-guide F. The opening for the reception of the latter passes through the cylinder. This enables a saw-guide to be used of a length greater than the depth of the cylinder, so that miters of considerable thickness may be cut, and yet the saw receive the requisite support from its guide to cut it smoothly and evenly in a vertical plane. In the other side, D, of the box are formed a series of hollow cylinders, G, and which are arranged at regular intervals apart, with a view to the cutting of miters at given angles. These cylinders may be formed similarly in all respects to the cylinder E, provided they are so arranged as that a line drawn through the axial point of each and the center of the cylinder E shall coincide with the respective angles of the required miters the box is intended to cut. Again, while it is not necessary that the slots *e* should be as large as the corresponding slots in the cylinder E, or so small as to form guides for the side of the saw, as such would injuriously affect the teeth; still it is better to make them tolerably large to facilitate the adjustment of the saw; and to so make them that a line drawn through their center shall coincide with a line drawn through the axis of each cylinder G and the axis of the cylinder E. To this end, however, the guide H is made removable, while the opening I in each cylinder is made of the same size and shape, so that the guide may be removed from the one and fitted into the other, as required, according to the angle of the miter to be cut.

From what has been said it will be apparent that, in the manufacture of the boxes the cylinders G may be so arranged with relation to the central pivotal cylinder E as to cut miters of any required angle. Again, while the cylinders E and G may be formed separately and then individually secured to the sides C and D I prefer to cast the one, E, in one piece with the side C, and the others, G, in one piece with the side D, as it gives much greater strength and rigidity to the box and stability to the guides The operation of the box is obvious to any one at all acquainted with the use of a miter-box, and therefore here requires no special description, further than to say, that the guide H is adjusted in such one of the cylinders G as corresponds to the angle of the miter required to be cut; when so adjusted the end of the saw is inserted, and the machine is ready for the cutting of the miter, it afterwards being transferred to the corresponding cylinder on the other side of the square or central cylinder, to cut the miter on the end of the corresponding piece.

Having described my invention, I claim—

1. A sliding pivotal saw-guide, F, as arranged and operating in the manner and for the purposes set forth.

2. In combination with the sliding pivotal saw-guide F, arranged substantially as described, I claim the saw-guide H, when operating in the manner and for the purposes set forth.

3. The combination of a removable saw-guide, H, with a miter-box provided with a series of stationary cylinders, in the manner and for the purpose set forth.

LEANDER WESLEY LANGDON.

Witnesses:
WILLIAM LYMAN,
A. PERRY PECK.